US012002318B2

(12) United States Patent
Uhl

(10) Patent No.: US 12,002,318 B2
(45) Date of Patent: Jun. 4, 2024

(54) DEVICE FOR TRANSPORTING NOTES OF VALUE

(71) Applicant: Wincor Nixdorf International GmbH, Paderborn (DE)

(72) Inventor: Alexander Uhl, Paderborn (DE)

(73) Assignee: WINCOR NIXDORF INTERNATIONAL GMBH, Paderborn (DE)

( * ) Notice: Subject to any disclaimer, the term of this patent is extended or adjusted under 35 U.S.C. 154(b) by 205 days.

(21) Appl. No.: 17/627,848

(22) PCT Filed: Jul. 6, 2020

(86) PCT No.: PCT/EP2020/068932
§ 371 (c)(1),
(2) Date: Jan. 18, 2022

(87) PCT Pub. No.: WO2021/008909
PCT Pub. Date: Jan. 21, 2021

(65) Prior Publication Data

US 2022/0262188 A1 Aug. 18, 2022

(30) Foreign Application Priority Data

Jul. 18, 2019 (DE) ......................... 102019119450.4

(51) Int. Cl.
*B65H 5/02* (2006.01)
*G07D 11/16* (2019.01)

(52) U.S. Cl.
CPC ............. *G07D 11/16* (2019.01); *B65H 5/025* (2013.01); *B65H 2404/1532* (2013.01); *B65H 2404/255* (2013.01); *B65H 2701/1912* (2013.01); *G07D 2211/00* (2013.01)

(58) Field of Classification Search
CPC ................................................ B65H 2404/255
See application file for complete search history.

(56) References Cited

U.S. PATENT DOCUMENTS

| | | | | |
|---|---|---|---|---|
| 5,482,266 | A | 1/1996 | Takemoto et al. | |
| 5,997,460 | A | 12/1999 | Young | |
| 6,726,202 | B1 | 4/2004 | Pai | |
| 8,820,730 | B2 * | 9/2014 | Jiang ...................... | B65H 31/24 271/3.01 |

FOREIGN PATENT DOCUMENTS

| | | | |
|---|---|---|---|
| EP | 2466555 | A1 | 9/2009 |
| WO | 2006094417 | A1 | 3/2005 |
| WO | 2012110629 | A1 | 2/2011 |

* cited by examiner

*Primary Examiner* — Howard J Sanders
(74) *Attorney, Agent, or Firm* — Black McCuskey

(57) ABSTRACT

A device for transporting notes of value comprises a first idler pulley mounted in the device and at least a second idler pulley mounted in the device, as well as an endless belt running around the idler pulleys, and a freely rotatable guide roller mounted in the device and having at least one connecting area for reception in a receiving opening of the device. The axis of rotation of the guide roller has in a first receiving position of the connecting area in the receiving opening a first orthogonal distance to a plane in which the axes of rotation of the idler pulleys run. The axis of rotation of the guide roller has in a second receiving position of the connecting area in the receiving opening a second orthogonal distance to the plane.

11 Claims, 10 Drawing Sheets

DEVICE FOR TRANSPORTING NOTES OF VALUE

CROSS-REFERENCE TO RELATED APPLICATIONS

This application is a National Phase filing of International Application Ser. No. PCT/EP2020/068932, for a DEVICE FOR TRANSPORTING NOTES OF VALUE, filed 2020 Jul. 6, which is hereby incorporated by reference in its entirety.

BACKGROUND AND SUMMARY

The invention relates to a device for transporting notes of value with an endless circulating belt which is guided around at least two deflection elements. In addition, in one aspect of the invention, a freely rotatable guide roller mounted in the device may be provided for guiding and/or tensioning the belt.

Such a device for transporting notes of value is in particular a component of a device for handling notes of value, such as an automated teller safe, an automatic point of sale ("POS") system and/or an automated teller machine, for example a deposit machine for depositing banknotes and checks, a dispensing machine for dispensing banknotes or a recycling machine for depositing and dispensing banknotes.

From document WO 2012/110629A1 a device for handling notes of value is known, in which for the transport of individual notes of value or a value note stack circulating endless belts are used, which contact the front and/or rear side of a banknote, in order to transport these by the adhesive friction between the belt and the note of value with a circulating movement of the belt. The notes of value are transported between the belt and press-on and guide elements or between two belts arranged opposite each other.

For the safe transport of notes of value with the aid of circulating belts, the belts must have a predetermined belt tension, especially when the opposite belt or the press-on and guide elements are pressed against the belt. To ensure a desired belt tension, guide rollers are known which press against the belt from inside or outside, in particular press against the belt with the aid of a spring. The problem is that the belt tension decreases over time, in particular due to material fatigue of the belt.

The driving force that can be transmitted from a driven idler pulley to the belt is substantially dependent on the wrap angle of the belt around the idler pulley and on the shape/structure, contact pressure force and friction coefficients of the contacting surfaces of the idler pulley and the belt. If a further pulley in contact with the belt is used instead of the idler pulley to drive the belt, or if the further pulley is driven via the belt, the transmissible driving force is also substantially dependent on the wrap angle of the belt around the idler pulley and on the shape/structure, contact pressure force and coefficients of friction of the contacting surfaces of the further pulley and the belt. The problem is that the belt tension and thus the contact pressure force between the belt and the idler pulley decreases over time, in particular due to material fatigue of the belt, and/or the coefficient of friction decreases, so that a safe drive of the belt and thus a safe transport of the notes of value with the aid of the belt is no longer guaranteed. For this reason, the belts for transporting notes of value in devices for handling notes of value are replaced regularly and in the event of problems.

It is the object of the invention to provide a device for transporting notes of value which is simple in design and can be maintained at low cost.

This object is solved by a device having the features disclosed herein. Advantageous embodiments of the invention are disclosed herein.

In a first aspect of the invention, the device for transporting notes of value comprises a freely rotatable guide roller mounted in the device and having at least one connecting area for reception in a receiving opening of the device. In a first receiving position of the connecting area in the receiving opening, the axis of rotation of the guide roller can be received such that it has a first orthogonal distance to a plane in which the axes of rotation of the idler pulleys for deflecting the endless belt run. In a second receiving position of the connecting area in the receiving opening, the axis of rotation of the tension pulley has a second orthogonal distance to this plane. Due to the different distance between the first receiving position and the second receiving position, the guide roller can only contact the belt in the first receiving position and tension it in the second receiving position or deflect it by a first distance in the first receiving position and by a second distance in the second receiving position, so that different tensioning forces for tensioning the belt result between the first receiving position and the second receiving position.

This makes it easy to retention the belt by simply removing the connecting area from the receiving opening and inserting the receiving area into the receiving opening in a different way. In particular, in the event of a lengthening due to wear or aging of the belt, it can be easily retensioned and continued to be used. Replacement of the belt is thus no longer absolutely necessary.

It is particularly advantageous if the axis of rotation of the tension pulley runs parallel to the plane in which the axes of rotation of the idler pulleys are arranged. This ensures uniform tensioning of the belt over the entire belt width.

It is particularly advantageous if the connecting area of the guide roller can be inserted into a slot-shaped receiving opening of the device. The slot-shaped receiving opening is provided in particular in a stationary housing element, a frame or a chassis of the device. It is particularly advantageous if the connecting area of the guide roller can be inserted into the slot-shaped receiving opening from above. Furthermore, it is particularly advantageous if the tension pulley contacts the circumferential surface of the belt from the outside, at least in the second position. This allows a simple structure and an easy assembly and disassembly of the guide roller. The contact from the outside presses the belt inward so that the wrap angles of adjacent pulleys/rollers, in particular adjacent idler pulleys, are increased.

Furthermore, it is advantageous if the guide roller, at least in the second position, presses from the outside against the circumferential surface of the belt such that the wrap angle of the belt around at least one idler pulley or around one guide, driving and/or driven roller is increased compared to the first position. This can ensure a safe drive of the belt or a safe drive of a driven roller.

A second aspect of the invention relates to a further device for transporting notes of value, which has a first idler pulley mounted in the device and at least one second idler pulley mounted in the device and an endless belt running around the idler pulleys. The first idler pulley has at least one connecting area for being received in a receiving opening of the device, wherein the axis of rotation of the first idler pulley in a first receiving position of the connecting area in the receiving opening has a first distance to the axis of rotation of the second idler pulley. Furthermore, in a second receiving position of the connecting area in the receiving opening, the axis of rotation of the first idler pulley has a second distance to the axis of rotation of the second idler roller. This allows the distance between the axes of rotation of the idler pulleys to be easily changed from the first distance to the second distance and vice versa without the need for further components or other elements. The first idler pulley simply has to be removed from the receiving opening and inserted into the receiving opening in the respective other receiving position. In this way, different tensions can be realized or the belt can be retensioned.

Both in the device according to the first aspect of the invention and in the device according to the second aspect of the invention, the connecting area and the receiving opening are formed such that, after insertion of the connecting area into the receiving opening, the connecting area is received in the receiving opening in a non-rotating manner. This enables simple assembly. Furthermore, this ensures that the connecting area does not inadvertently move from the first to the second receiving position or vice versa.

Furthermore, it is advantageous if the connecting area is received in the receiving opening in the second position rotated by 180° about the axis of rotation of the guide roller or about the axis of rotation of the idler pulley relative to the first position. In this case, the receiving area preferably remains unchanged, i.e. no additional component is introduced into the receiving opening, nor is any component removed from the receiving opening.

Furthermore, it is advantageous if the receiving area is formed stationarily in a frame or in a component of the device. The component can in turn be designed to be movable relative to the frame of the device. This makes it possible to construct the device for transporting notes of value in a cost-efficient manner.

It is particularly advantageous if at least one, preferably the second, idler pulley can be driven with the aid of a drive unit, the other idler pulley preferably being mounted so as to be freely rotatable. In other embodiments, the second idler pulley serves as a driven pulley for driving a further element or a further assembly unit. This allows an easy and cost-efficient assembly as well as a simple construction of the device for transporting notes of value.

The belt can in particular be a flat belt, a fan belt, a toothed belt or a V-belt. The notes of value to be transported can rest individually or as a value note stack on the belt or be arranged between the belt and the tension pulley. This allows a simple design depending on the application and requirements.

It is also advantageous if the guide roller or the first idler pulley comprises a roller element that can rotate freely on an axle element. In this case, it is advantageous if a connecting element is provided at each end of the axle element projecting laterally from the roller element. In this way, the guide roller or the first idler pulley can easily be mounted on both sides, which considerably simplifies the construction of the device and allows the belt to be driven with low oscillation and vibration.

It is particularly advantageous if the roller element is arranged on the axle element so that it cannot be displaced axially. The guide roller or the first idler pulley is not displaced even in the event of transverse forces acting on the belt, so that the belt is reliably guided by the guide roller or the first idler pulley.

It is particularly advantageous if an axle element is formed in at least two parts. Preferably, the axle element comprises two axle element parts, wherein one axle element part each can be inserted into the roller element on one side. This permits a simple design and an easy assembly of the guide roller and the first idler pulley, respectively. The two axle element parts are preferably connected to each other in the roller element. This can be done in particular by means of a plug-in, snap-in, press, screw and/or welded connection. This allows an easy manufacture and an easy assembly and, if necessary, disassembly of the guide roller and the first idler pulley. It is particularly advantageous if the roller element is freely rotatably arranged on the axle element via at least one plain and/or roller bearing. This ensures good running properties of the roller element and thus low-loss rotation of the guide roller and the idler pulley, respectively.

BRIEF DESCRIPTION OF THE DRAWINGS

Further features and advantages result from the following description of embodiments as well as in connection with the attached figures.

DETAILED DESCRIPTION

Figure 1:
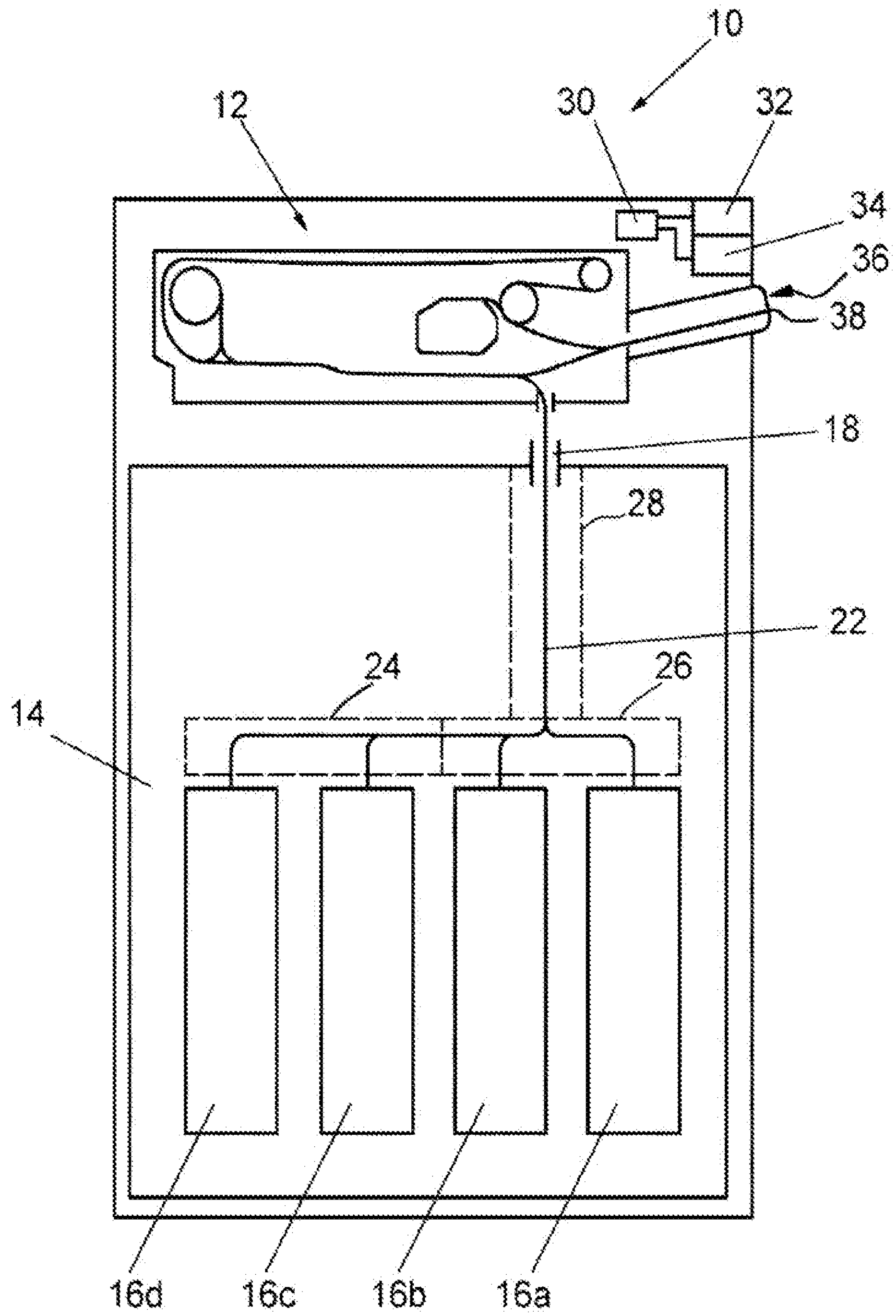
FIG. 1 shows a schematic illustration of a device for handling notes of value.

FIG. 1 is a schematic illustration of a device 10 for handling notes of value. The device 10 is in particular an automated teller safe, an automatic POS system and/or an automated teller machine, such as a deposit machine for depositing banknotes and checks.

The device 10 comprises a head module 12 and a safe 14. Four value note cassettes **16*a* to 16*d* are arranged in the safe 14, in which the notes of value can be accommodated. In particular, one of the value note cassettes 16*a* to 16*d* is provided for receiving checks and the other three value note cassettes 16*a* to 16*d* are provided for receiving banknotes. The banknotes are accommodated in particular by type, i.e. only banknotes of one denomination are accommodated in one value note cassette 16*a* to 16*d*. Alternatively, mixed storage is also possible, i.e. notes of value of different denominations are mixed in one value note cassette 16*a* to 16*d*. In an alternative embodiment, also more than four or less than four, in particular two, value note cassettes 16*a* to 16*d* can be provided in the safe 14. In particular, a so-called reject cassette can be provided, in which notes of value that are suspected of being counterfeit and/or show damage are held. In a preferred embodiment, two value note cassettes 16*a* to 16*d*** are provided, namely one for holding checks and one for holding banknotes.

The notes of value can be stored in the value note cassettes 16*a* to 16*d* both in stacked form in a receiving area and wound up between two film strips on a roll storage device. Different types of value note cassettes may also be used within the safe 14.

In the present embodiment, the device 10 may be designed as a depositonly device in which notes of value may only be received. Alternatively, it may be designed as a recycling device in which both notes of value can be input and notes of value can be output.

The head module 12 has an input and output unit 36, via which the notes of value can be input in the form of a value note stack. Furthermore, this input and output unit 36 can also be used to output individual notes of value and/or value note stacks to the operator of the device 10. In particular, the input and output unit 36 has a so-called shutter 38, via which an opening for feeding and outputting the notes of value can be opened and closed.

The safe 14 has a transfer slot 18 through which the notes of value are fed from the head module 12 to the safe 14. From the transfer slot 18, the notes of value are transported to the value note cassettes 16*a* to 16*d* via a transport path identified by the reference sign 22. The transport path 22 is formed by several transport units 24 to 28.

The head module 12 further comprises a control unit for controlling the components of the device 10, in particular for controlling drive units of the transport units 24 to 28: Furthermore, the head module 12 comprises an output unit 32 connected to the control unit 30, which output unit serves in particular for displaying information, and an input unit 34, which serves in particular for inputting information. The input unit 34 and the output unit 32 serve as a human-machine interface.

Figure 2:
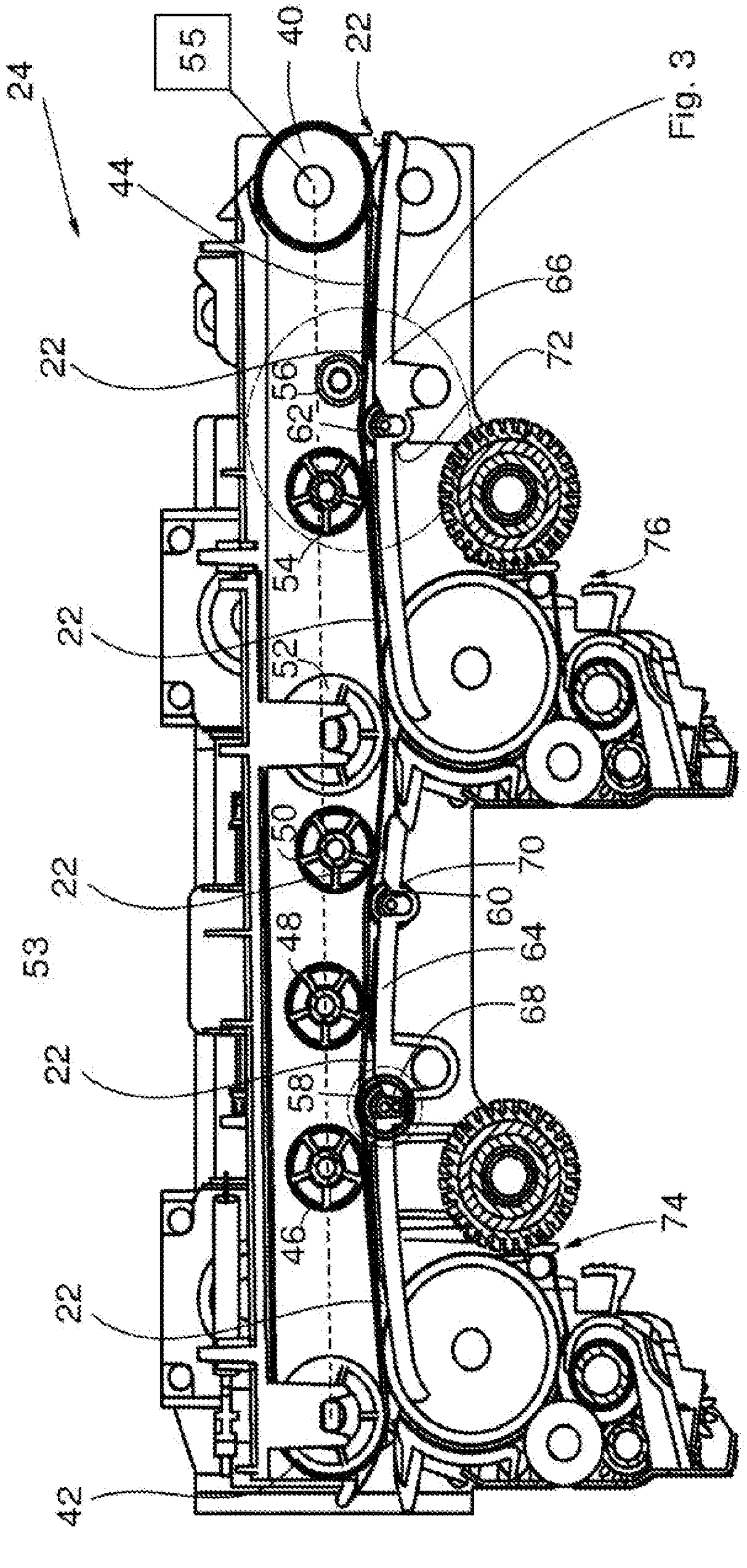
FIG. 2 shows a side view of a transport unit for transporting notes of value of the device according to FIG. 1.

FIG. 2 shows a side view of the transport unit 24 for transporting notes of value of the device 10 according to FIG. 1.

The transport unit 24 comprises a first driven idler pulley 40 and a second non-driven idler pulley 42 around which a circulating transport belt 44 is guided for transporting notes of value not shown. FIG. 2 schematically shows a drive unit 55 to drive the first driven idler pulley 40. The transport unit 24 further comprises a plurality of freely rotating guide rollers 46 to 56 which contact the inner side of the circulating belt 44, and freely rotating guide rollers 58 to 62 which contact the outer side of the endless belt 44 at least when no notes of value are being transported in the transport path 22 formed by the belt 44 and the guide rollers 58 to 62 and by guide elements 64, 66. The transport unit 24 has a frame comprising the guide elements 64, 66. Depending on the arrangement of the guide rollers 58 to 62 in the receiving openings 68 to 72 provided in the frame of the transport unit 24, the guide rollers 58 to 62 only contact the outer circumferential surface of the belt 44 or tension the belt 44 by corresponding deflection of the belt 44. In the arrangement of the guide rollers 58 to 62 shown in FIG. 2, the guide rollers 58 to 62 deflect the belt 44 towards the inner space enclosed by the belt 44 by contact of the guide rollers 58 to 62 on the outer surface of the belt 44, so that the belt 44 is tensioned. As a result of the deflection of the belt 44, the belt 44 is forced by the guide roller 58 into the region between the guide rollers 46 and 48, by the guide roller 60 into the region between the guide rollers 48 and 50 and by the guide roller 62 into the region between the guide rollers 54 and 56 so that the angle of wrap of the belt 44 is increased for both the inner guide rollers 46, 48, 50, 54, 56 and the outer guide rollers 58, 60, 62.

The transport unit 24 further comprises a first removal unit 74 for removing notes of value from the cassette 16*d*, and a removal unit 76 for removing notes of value from the cassette 16*c*.

If, in other embodiments, only notes of value are to be deposited with the aid of the device 10, the units 74, 76 are designed as feed units and, if the device 10 is designed as a recycling device for depositing notes of value and for dispensing these notes of value again, they are designed as feed and withdrawal units for feeding notes of value into the respective cassette 16*c*, 16*d* and for withdrawing notes of value from the respective cassette 16*c*, 16*d*.

Figure 3:
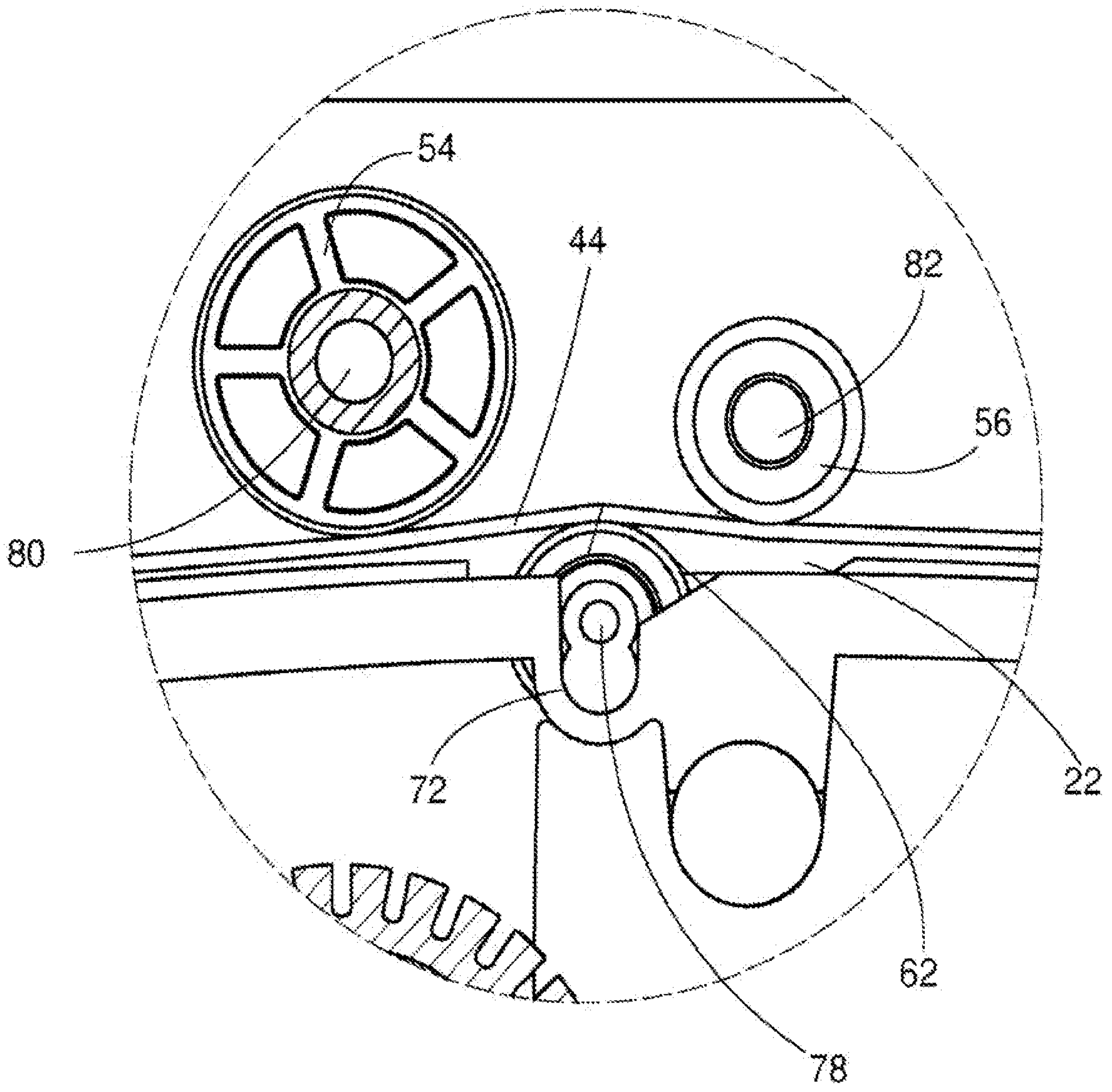
FIG. 3 shows a first section of the transport unit according to FIG. 2.

FIG. 3 shows a first section of the transport unit 24 according to FIG. 2, in which the guide rollers 54, 56, 62 and the belt 44 are shown. The guide rollers 58 to 62 each have a roller element freely rotatable on an axle element, wherein an axle end of the axle element projecting laterally from the roller element serves as a connecting area. The roller elements are arranged in particular on the axle element so as not to be axially displaceable. The axle ends are designed such that they can be inserted into the receiving openings 68 to 72 of the frame of the transport unit 24 both in the position shown in FIGS. 2 and 3 and in a position rotated by 180° about an axis of rotation 78 of the roller 62. In a first position, the axis 78 is a first orthogonal distance to a plane 53 (referenced in FIG. 2) in which the axes of rotation of the idler pulleys 40 and 42 run. In the position rotated by 180°, a second position, the axis of rotation 78 is arranged further away from the belt 44, a second orthogonal distance from the plane 53, so that the circumferential surface of the guide roller 62 is also arranged further away from the axes of rotation 80, 82 of the guide rollers 54, 56. As a result, the guide roller 62 does not press the belt 44 into the area between the guide rollers 54, 56, as a result whereof the belt 44 is less tensioned.

Figure 4:
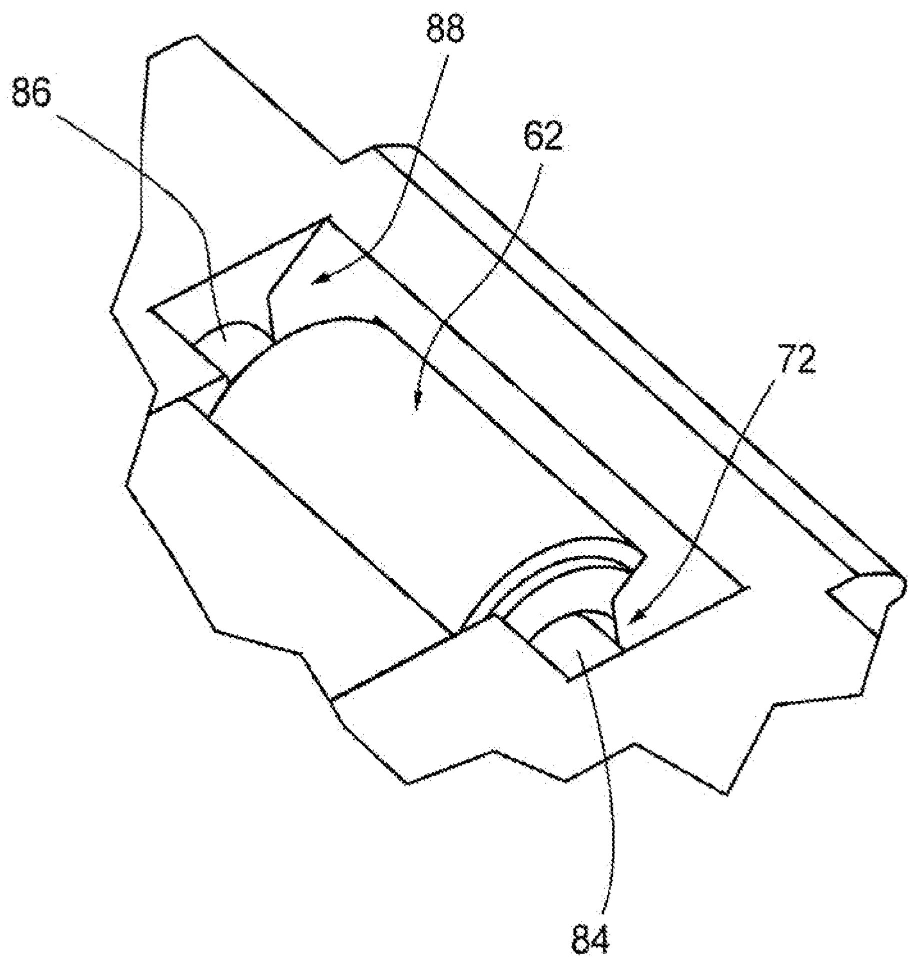
FIG. 4 shows a second section of the transport unit according to FIG. 2.

FIG. 4 shows a second section of the transport unit according to FIG. 2, wherein the guide roller 62 is shown in a perspective view without the belt 44. In FIG. 4, it is clearly visible that the connecting areas of the guide roller 62 formed by the axle ends 84, 86 are arranged in the receiving areas 72, 88. The guide roller 62 can be removed from the receiving areas 72, 88. The connecting areas, i.e. the axle ends 84, 86, can then be rotated together by 180° and then reinserted in the receiving openings 72, 88, the guide roller 62 then being arranged deeper in the guide element 66, so that the circumferential surface of the guide roller 62 then only contacts the outer circumferential surface of the belt 44 and no longer tensions the belt 44. Each of the guide rollers 58 to 62 can be arranged either in the position shown in FIG. 2, in which the respective guide roller 58 to 62 tensions the belt 44, or in a position with the connecting areas rotated by 180, in which it merely contacts the belt 44. In this way, a total of four different belt tensions can be realized with the three guide rollers 58 to 62.

Figure 5:
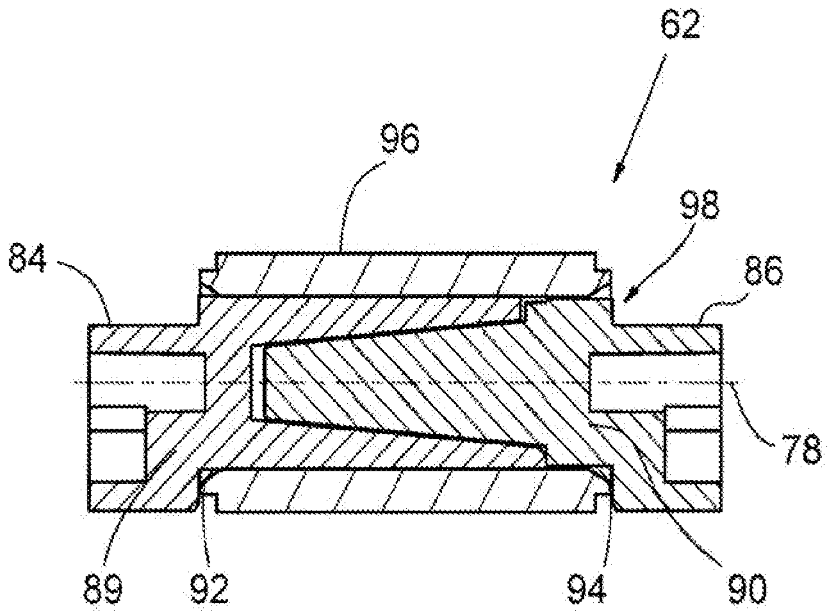
FIG. 5 shows a sectional view of a guide roller of the transport unit according to FIG. 2.

FIG. 5 shows a sectional view of the guide roller 62. The structure of the guide roller 62 corresponds to the structure of the guide rollers 58, 60. A roller element 96 is freely rotatably arranged on an axle element 98, the axle element 98 being composed of two axle element parts 89, 90. A shoulder 92, 94 is formed in each of the axle element parts 89, 90, by means of which axial displacement of the roller element 96 is prevented. To assemble the guide roller 62, the axle element parts 89, 90 are each inserted into the hollow roller element 96 from one side and preferably connected to one another. Alternatively, the axle element parts 89, 90 can also only be loosely inserted into one another and, after being received in the receiving openings 72, 88, held in these openings such that they cannot move out of the roller element 96 in the direction of the axis of rotation 78.

One axle end 84, 86 of each of the axle element parts 89, 90 protrudes laterally from the roller element 96. The axle ends 84, 86 each form a connecting area of the axle element 98.

Figure 6:
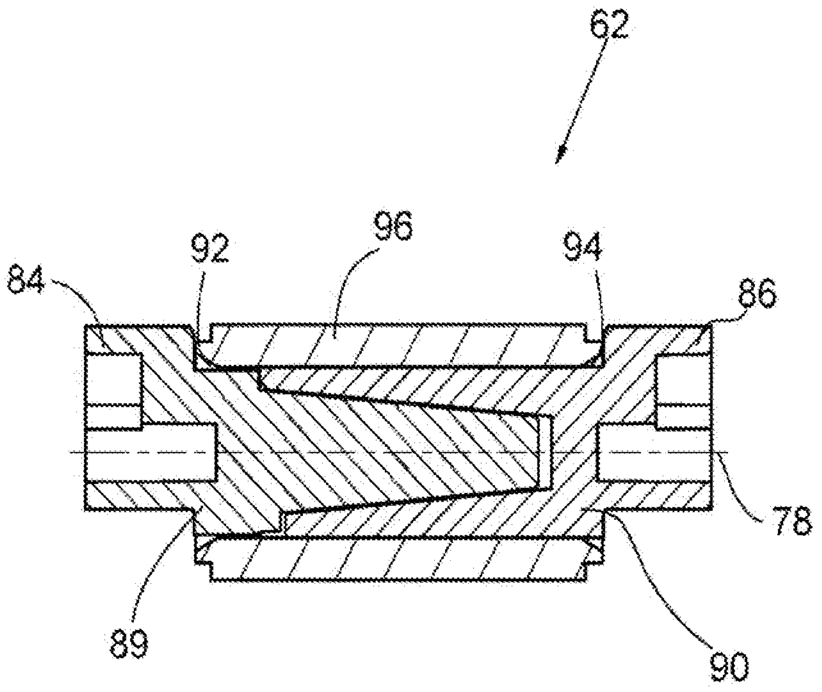
FIG. 6 shows a sectional view of the guide roller according to FIG. 5 in a position rotated by 180°.

The connecting areas 84, 86 are designed such that they can be inserted into the receiving openings 72, 88 both in the position shown in FIGS. 2 to 5 and in a position rotated by 180° about the axis of rotation 78 as shown in FIG. 6.

Figure 7:
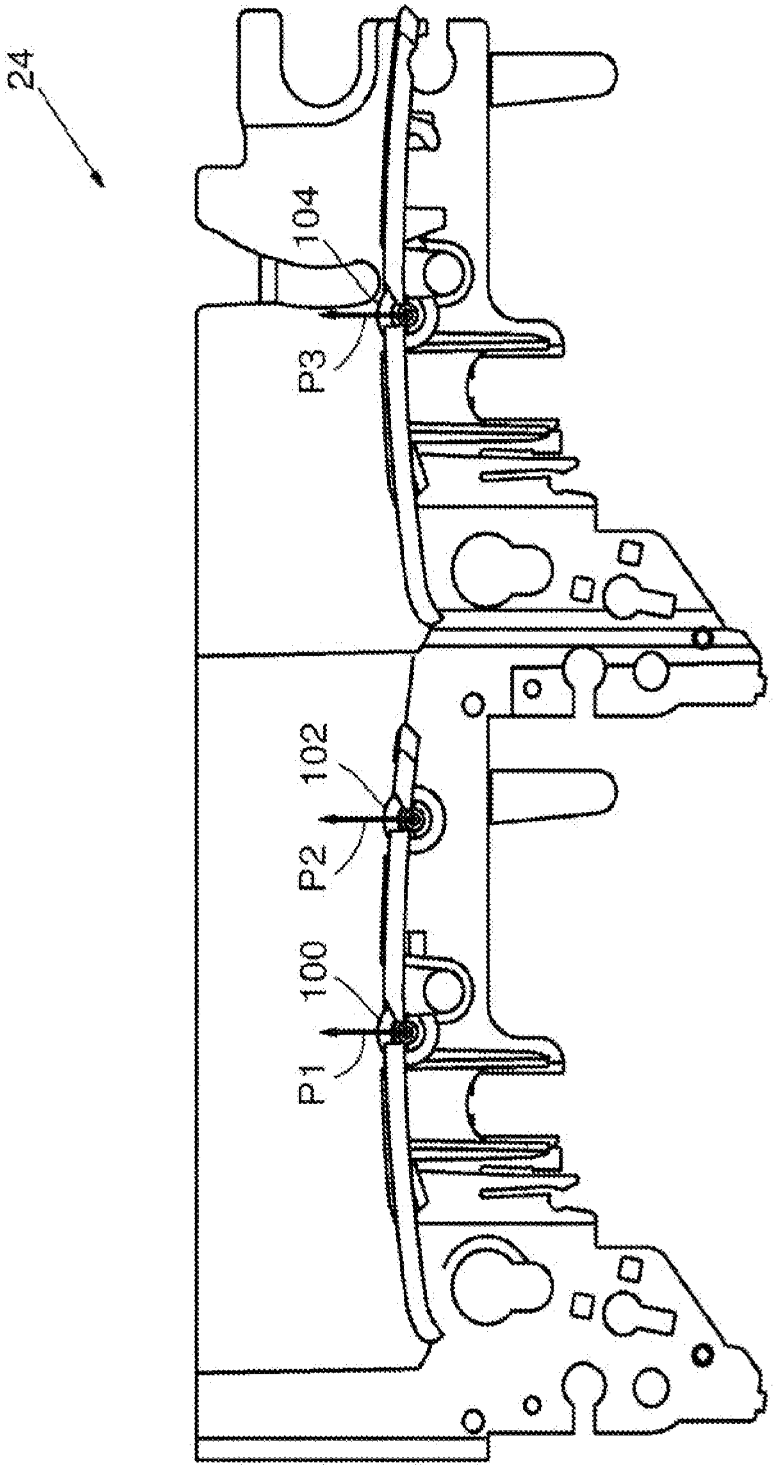
FIG. 7 shows a side view of elements of the transport unit according to FIG. 2 with known guide rollers.

In FIG. 7, a side view of the transport unit 24 is shown, wherein guide rollers 100, 102, 104 known from the prior art are inserted into the receiving openings 68 to 72, which guide rollers can be removed from the receiving openings 68, 70, 72 in the direction of the arrows P1, P2 and P3 and replaced by the guide rollers 58, 60, 62 in order to increase the belt tension of the belt 44, as shown in FIG. 2.

Figure 8:
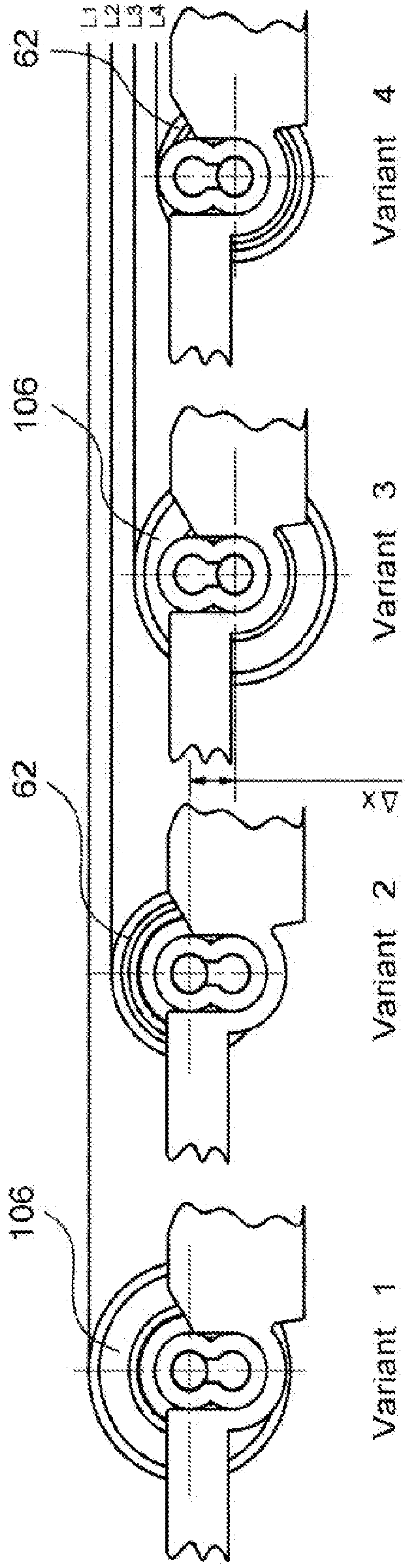
FIG. 8 shows a schematic illustration of a total of four contact positions of guide rollers.

FIG. 8 shows a schematic illustration of altogether four contact positions of guide rollers 62, 106, which can be inserted, for example, into the receiving openings 72, 88. In variant 4, the guide roller 62 is arranged in the position shown in FIG. 6, in which the guide roller 62 merely contacts the belt 44, and in variant 2, in the position shown in FIGS. 2, 3 and 5, in which it tensions the belt 44. The guide roller 62 can be exchanged for another guide roller 106 with a larger outer diameter, as shown in variants 1 and 3. In variant 3, the guide roller 106 tensions the belt 44 in contrast to variant 4, but not as strongly as in variant 2. If the position of the guide roller 106 is changed by rotating the connecting areas of the guide roller 106 by 180°, the belt 44 is tensioned more strongly than in variants 2 and 3. With the aid of the two guide rollers 62, 106, the position of which can be changed in each case, there are thus a total of four different height levels L1 to L4, so that four tensioning states of the belt 44 can be produced.

The position of the axis of rotation is shifted by the amount Δx in variants 3 and 4 compared to variants 1 and 2.

Figure 9:
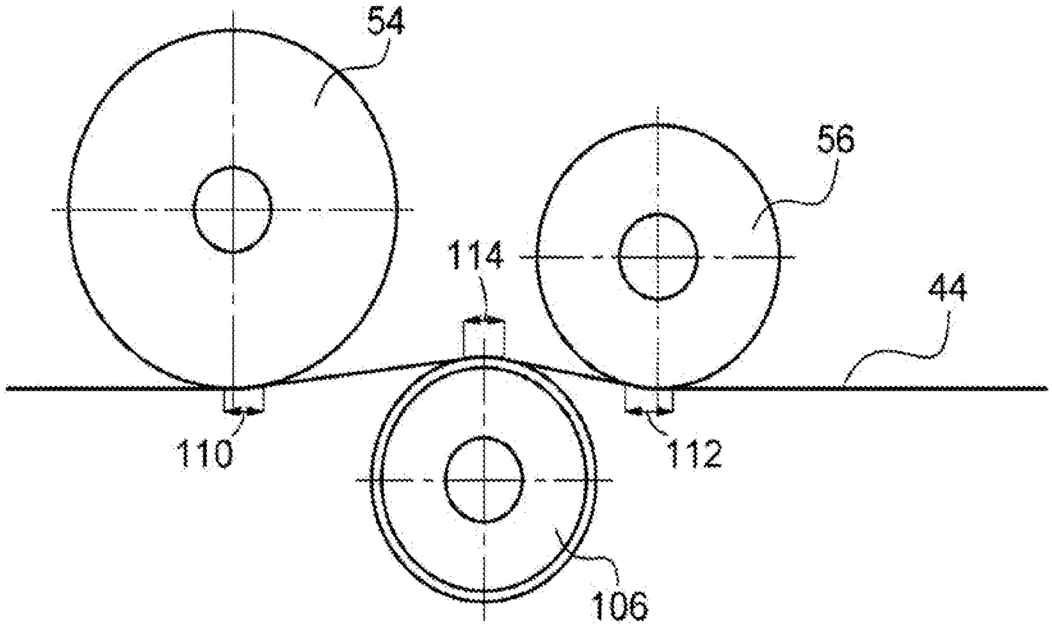
FIG. 9 shows a schematic illustration of three rollers and a belt with a first position relative to each other.

FIG. 9 shows the schematic arrangement of three guide rollers and a belt in a first position according to variant 3 as shown in FIG. 8. Guide rollers 54, 56 and 106 as well as the belt 44 have been selected as examples. In the position of the guide rollers 54, 56, 106 relative to each other shown in FIG. 9, the belt 44 has a contact area 110 with the guide roller 54, a contact area 112 with the guide roller 56 and a contact area 114 with the guide roller 106.

Figure 10:
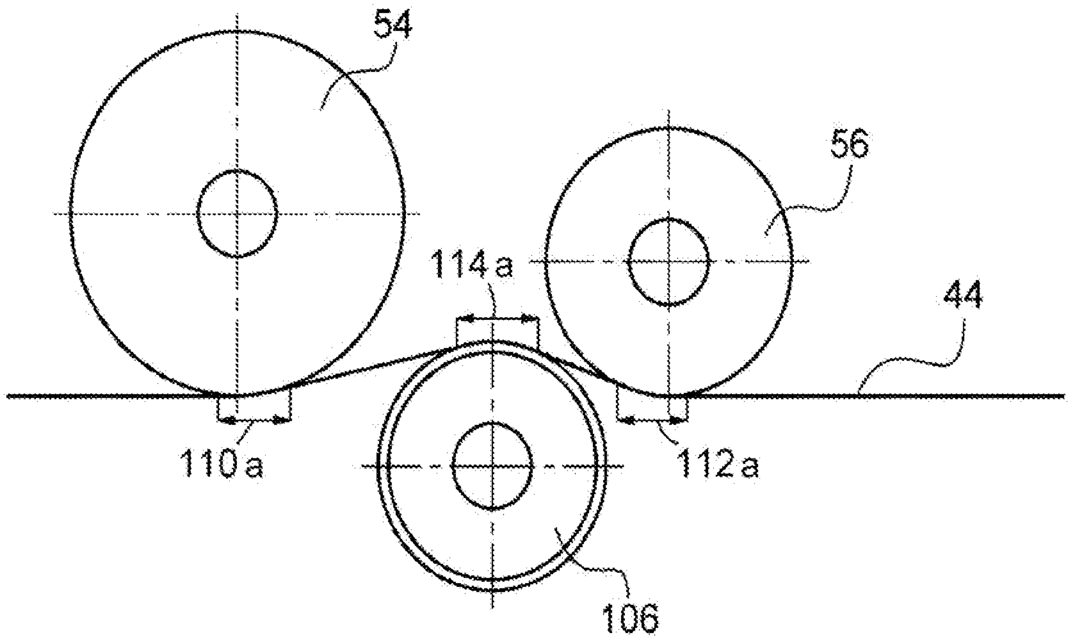
FIG. 10 shows a schematic illustration of the three rollers and the belt according to FIG. 9 with a second position relative to each other.

FIG. 10 shows a schematic illustration of the three rollers 54, 56, 106 and the belt 44 according to FIG. 9, in which the guide roller 106 is arranged in the variant 1 shown in FIG. 8, so that the belt 44 is further tensioned compared to FIG. 9. This also increases a contact area 110*a* to the guide roller 54 greater than contact area 110, a contact area 112*a* to the guide roller 56 greater than the contact area 112, and a contact area 114*a* to the guide roller 106 greater than the contact area 114, which also increases the wrap angles of the respective rollers 54, 56, 106.

The invention claimed is:

1. A device for transporting notes of value comprising:
- a first idler pulley and a second idler pulley;
- an endless belt running around the first and second idler pulleys;
- at least one guide element having at least one receiving opening;
- a freely rotatable guide roller having at least one connecting area receivable in the at least one receiving opening of the at least one guide element in alternative, first and second receiving positions;
- wherein an axis of rotation of the guide roller when the guide roller is in the first receiving position has a first orthogonal distance to a plane in which axes of rotation of the first and second idler pulleys run;
- wherein the axis of rotation of the guide roller when the guide roller is in the second receiving position has a second orthogonal distance to the plane, the first and second orthogonal distances different from one another; and
- wherein the at least one connecting area is rotated 180° about the axis of rotation to change between the first and second receiving positions and wherein the at least one receiving opening remains unchanged; and
- wherein the belt is further defined as a flat belt or a toothed belt or a V-belt and wherein the notes of value to be transported rest individually or as a value note stack on the belt and are arranged between the belt and the guide roller.

2. The device of claim 1 wherein the axis of rotation of the guide roller runs parallel to the plane.

3. The device of claim 1 wherein the at least one connecting area of the guide roller is insertable into the at least one receiving opening from above, and wherein the guide roller contacts a circumferential surface of the belt from outside of the belt at least when the at least one connecting area is in the second receiving position.

4. The device of claim 1 wherein the guide roller at least when the at least one connecting area is in the second receiving position, presses against an outside of a circumferential surface of the belt such that a first wrap angle of the belt around at least one of the first and second idler pulleys or around the guide roller is increased as compared to a second wrap angle of the belt when the at least one connecting area is in the first receiving position.

5. The device of 1 wherein the at least one connecting area is received in the at least one receiving opening in a non-rotating manner.

6. The device of claim 1 wherein the at least one receiving area is formed stationarily in at least one guide element.

7. The device of claim 1 wherein at least one preferably of the first and second idler pulleys is drivable with drive unit and wherein the other of the first and second idler pulleys is mounted freely rotatably.

8. The device of claim 1 wherein at least one of the guide roller further comprises:
- an axle element extending between first and second axle ends; and
- a roller element freely rotatable on the axle element, wherein the at least one connecting area further defined as first and second connecting areas; wherein the first and second connecting areas are respectively provided at each of the first and second axle ends of the axle element projecting laterally away from the roller element along the axis of rotation.

9. The device according to claim 8 wherein the roller element is arranged on the axle element so as not to be axially displaceable along the axis of rotation.

10. A device for transporting notes of value comprising:
- a first idler pulley and a second idler pulley;
- an endless belt running around the first and second idler pulleys;
- at least one guide element having at least one receiving opening;
- a freely rotatable guide roller having at least one connecting area receivable in the at least one receiving opening of the at least one guide element in alternative, first and second receiving positions;

wherein an axis of rotation of the guide roller when the guide roller is in the first receiving position has a first orthogonal distance to a plane in which axes of rotation of the first and second idler pulleys run;

wherein the axis of rotation of the guide roller when the guide roller is in the second receiving position has a second orthogonal distance to the plane, the first and second orthogonal distances different from one another; and wherein the at least one connecting area is rotated 180° about the axis of rotation to change between the first and second receiving positions and wherein the at least one receiving opening remains unchanged; and wherein at least one of the guide roller further comprises:

an axle element extending between first and second axle ends; and a roller element freely rotatable on the axle element, wherein the at least one connecting area further defined as first and second connecting areas; wherein the first and second connecting areas are respectively provided at each of the first and second axle ends of the axle element projecting laterally away from the roller element along the axis of rotation; and wherein the axle element further comprises first and second axle element parts and wherein the first and second axle element parts are each inserted into opposite sides of the roller element.

11. The device according to claim 10 wherein the first and second axle element parts are connected to each other in the roller element by way of at least one of a plug-in, snap-in, press, screw, and a welded connection.

* * * * *